(12) United States Patent
Choo et al.

(10) Patent No.: US 7,016,147 B2
(45) Date of Patent: Mar. 21, 2006

(54) DISK CLAMP BALANCING IN A DISC STACK ASSEMBLY

(75) Inventors: Victor Chi Siang Choo, Singapore (SG); PohLye Lim, Singapore (SG); Boon Seng Ong, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 45 days.

(21) Appl. No.: 10/180,214

(22) Filed: Jun. 26, 2002

(65) Prior Publication Data

US 2003/0112553 A1 Jun. 19, 2003

Related U.S. Application Data

(60) Provisional application No. 60/341,322, filed on Dec. 13, 2001.

(51) Int. Cl.
G11B 17/022 (2006.01)
G11B 23/03 (2006.01)

(52) U.S. Cl. .................................... 360/99.12
(58) Field of Classification Search ............. 360/99.12, 360/98.08
See application file for complete search history.

(56) References Cited

U.S. PATENT DOCUMENTS

| | | | | |
|---|---|---|---|---|
| 4,249,221 A | * | 2/1981 | Cox et al. ................. | 360/99.12 |
| 4,639,802 A | | 1/1987 | Neubauer et al. | |
| 5,274,517 A | * | 12/1993 | Chen ........................ | 360/98.08 |
| 5,295,030 A | * | 3/1994 | Tafreshi ................... | 360/99.12 |
| 5,452,157 A | * | 9/1995 | Chow et al. .............. | 360/98.08 |
| 5,486,961 A | * | 1/1996 | Boutaghou et al. ...... | 360/99.12 |
| 5,555,144 A | | 9/1996 | Wood et al. | |
| 5,694,269 A | * | 12/1997 | Lee .......................... | 360/98.08 |
| 5,724,209 A | * | 3/1998 | Dunckley et al. ........ | 360/98.08 |
| 5,768,051 A | * | 6/1998 | Kora et al. ............... | 360/98.08 |
| 5,822,151 A | * | 10/1998 | Albrecht et al. ......... | 360/98.08 |
| 5,896,242 A | * | 4/1999 | Albrecht et al. ......... | 360/98.08 |
| 5,943,184 A | * | 8/1999 | Kelsic et al. ............. | 360/98.08 |
| 5,982,581 A | * | 11/1999 | Kazmierczak et al. ... | 360/98.08 |
| 6,158,112 A | | 12/2000 | Kim et al. | |
| 6,288,867 B1 | | 9/2001 | Jierapipatanakul et al. | |
| 6,304,412 B1 | * | 10/2001 | Voights ................... | 360/98.08 |
| 6,462,903 B1 | * | 10/2002 | Yamada et al. .......... | 360/99.12 |
| 6,563,668 B1 | * | 5/2003 | Suwito .................... | 360/98.08 |
| 6,594,109 B1 | * | 7/2003 | Renken .................... | 360/98.08 |
| 6,603,636 B1 | * | 8/2003 | Schwandt et al. ....... | 360/99.12 |
| 6,690,541 B1 | * | 2/2004 | Kazmierczak ........... | 360/98.08 |
| 6,724,568 B1 | * | 4/2004 | Suwito et al. ........... | 360/99.12 |
| 6,798,614 B1 | * | 9/2004 | Buske et al. ............. | 360/99.12 |
| 2002/0024763 A1 | * | 2/2002 | Drake et al. ............. | 360/99.12 |

FOREIGN PATENT DOCUMENTS

| | | | |
|---|---|---|---|
| JP | 02210681 A | * | 8/1990 |
| JP | 03254461 A | * | 11/1991 |

(Continued)

Primary Examiner—Craig A. Renner
(74) Attorney, Agent, or Firm—Fellers, Snider, et al.

(57) ABSTRACT

An apparatus and method for balancing a disc stack assembly of a disc drive where a clamp is used as a counterbalance as well as for securing a disc to the disc stack assembly. The clamp and spindle motor are configured for positive engagement and alignment with the use of a minimal number of parts. The clamp includes a cavity through which a protrusion or a shaft of the spindle motor hub may extend. The clamp may be further secured in a desired orientation by the use of a single fastener.

20 Claims, 8 Drawing Sheets

FOREIGN PATENT DOCUMENTS

| | | | |
|---|---|---|---|
| JP | 07296545 A | * | 11/1995 |
| JP | 10293985 | * | 11/1998 |
| JP | 10320946 | * | 12/1998 |
| JP | 2000195124 | * | 7/2000 |

* cited by examiner

DISK CLAMP BALANCING IN A DISC STACK ASSEMBLY

CROSS REFERENCE TO RELATED APPLICATIONS

This application claims benefit of U.S. Provisional Application No. 60/341,322 filed on Dec. 13, 2001.

FIELD OF THE INVENTION

The present invention relates generally to disc drives. More particularly, the present invention relates to an improved disc clamp and motor hub assembly for use in a disc stack assembly (DSA) for a disc drive.

BACKGROUND OF THE INVENTION

Modern computer systems store data in devices or components internally or externally for later usage. There are various types of storage devices for which the computer systems could read/write data from/to the devices. One of the most widely used devices for storing massive amount of data in a computer system is a disc drive having a DSA.

The capacity of a disc drive depends on the numbers of tracks on the surface of the disc. When more tracks are formatted on a disc, the precision at which the transducer could read from or write to the disc becomes critical. There are a number of reasons that could cause the reading/writing process to be inaccurate, for example, imbalance of the disc drive, etc. Imbalance of a disc drive may be caused by the uneven distribution of mass about the axis of rotation of the DSA. Such imbalance may be the result of the disc shifting in a radial direction, sometimes known as "disc slip", which in turn may cause inaccurate positioning of the transducer. When the number of tracks on the disc greatly increase, any imprecise positioning of the transducer becomes more critical to the overall performance of the disc drive.

There are a number of ways to reduce the imbalance of the DSA in a disc drive. For example, by biasing the disc(s) and spacer(s) in opposite directions with reference to the center of the motor shaft, and thereby having substantially equal mass distributed around the motor shaft longitudinal axis. While various devices and methods may be known for balancing a DSA, it is a continuous challenge to reduce the number of components and to simplify the steps in assembly so as to achieve greater manufacturing efficiency.

The present invention provides a solution to reduce the instability of the disc drive and at the same time reduces the use of spacers and/or balancing rings so as to cut down the production cost, and also provides other advantages over the prior art.

SUMMARY OF THE INVENTION

The present invention relates to disc stack assembly (DSA) which includes, by way of example and not limitation, a clamp and a motor hub that provides a solution to the above-mentioned problem.

In one embodiment of the invention, a DSA includes a motor shaft defining a vertical axis and a motor hub surrounding the motor shaft, the motor hub being rotatable about an axis of rotation. A disc is mounted on the motor hub where a clamp is used to tighten the disc on the motor hub by a fastener. The shaft protrudes from the motor hub for engagement with a hole of the clamp. The clamp may be formed such that in assembly with the DSA, its center of mass does not coincide with the axis of rotation, so as to provide a counter-balance to the DSA. The direct engagement of the clamp to the shaft, or an equivalent extension from the motor hub reduces the number of components required to align and retain the clamp in a desired orientation for balancing the DSA. Using the same engagement, the clamp can be secured to the DSA, thereby fulfilling another of its function, that of securing the disc to the motor hub.

The motor hub includes a sunk-in portion in the middle of an upper surface of the motor hub. A clamp is assembled with the motor hub so that it clamps the disc to the motor hub. Within the DSA the motor shaft extends through the motor hub but does not protrude beyond an upper surface of the clamp when the clamp is in a post-depressed position. The clamp is installed on the hub by aligning an opening in the clamp with the motor shaft protrusion. A tight tolerance is established between the opening of the clamp and the outer surface of the motor shaft so as to center the clamp around the hub axis of rotation. The clamp is then tightened onto the motor hub with a fastener. An engagement feature located along the inner diameter of the clamp ensures a positive engagement between the clamp and the fastener.

According to another embodiment of the present invention, the clamp has a greater height reference than the motor shaft protrusion. This will enable the motor shaft not to protrude beyond the upper surface of the clamp at the post-depressed position.

DETAILED DESCRIPTION

Figure 1:
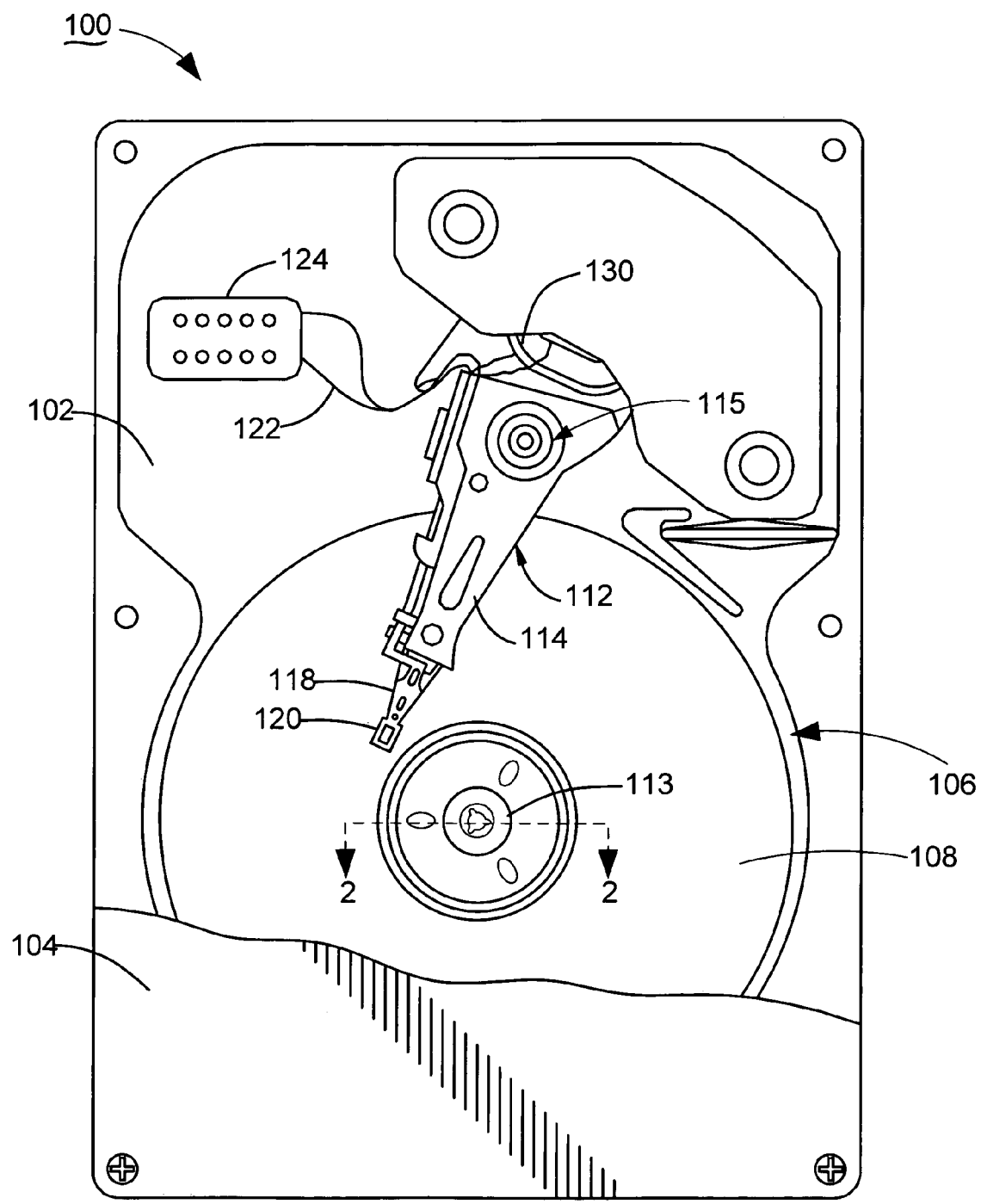
FIG. 1 is a diagrammatic plan view of a disc drive constructed in accordance with an embodiment of the present invention.

FIG. 1 illustrates a plan view of a disc drive 100 having a base 102 and a cover 104 in assembly with the base 102. After the various components have been installed on the base 102, the disc drive 100 will be firmly sealed by the cover 104 to maintain a clean internal environment. A circuit board (not shown) attached to the bottom of base 102 controls most drive operations, such as the operation of the spindle motor and read/write operations. Connector 124 leads to a flexible printed circuit cable 122 which in turn is operably connected to other circuitry for receiving and transmitting data and/or commands between the circuit board and actuator arm assembly 112. Details of the circuitry operations are not presented herein as they are well known to a skilled artisan.

Data is read from or written to concentric tracks on a disc 108 by a transducer 120. A DSA 106 includes a spindle motor 113 that rotates the disc 108. During drive operations, the disc 108 is rotated at a high speed while the transducer 120 is held over a desired track of the disc 108. The transducer 120 is coupled to an actuator arm 114 via a suspension 118 which is rotatable about a pivot assembly 115. A voice coil motor 130, attached to the other end of the actuator arm 114, controls the rotation and positioning of the actuator arm 114.

Figure 2:
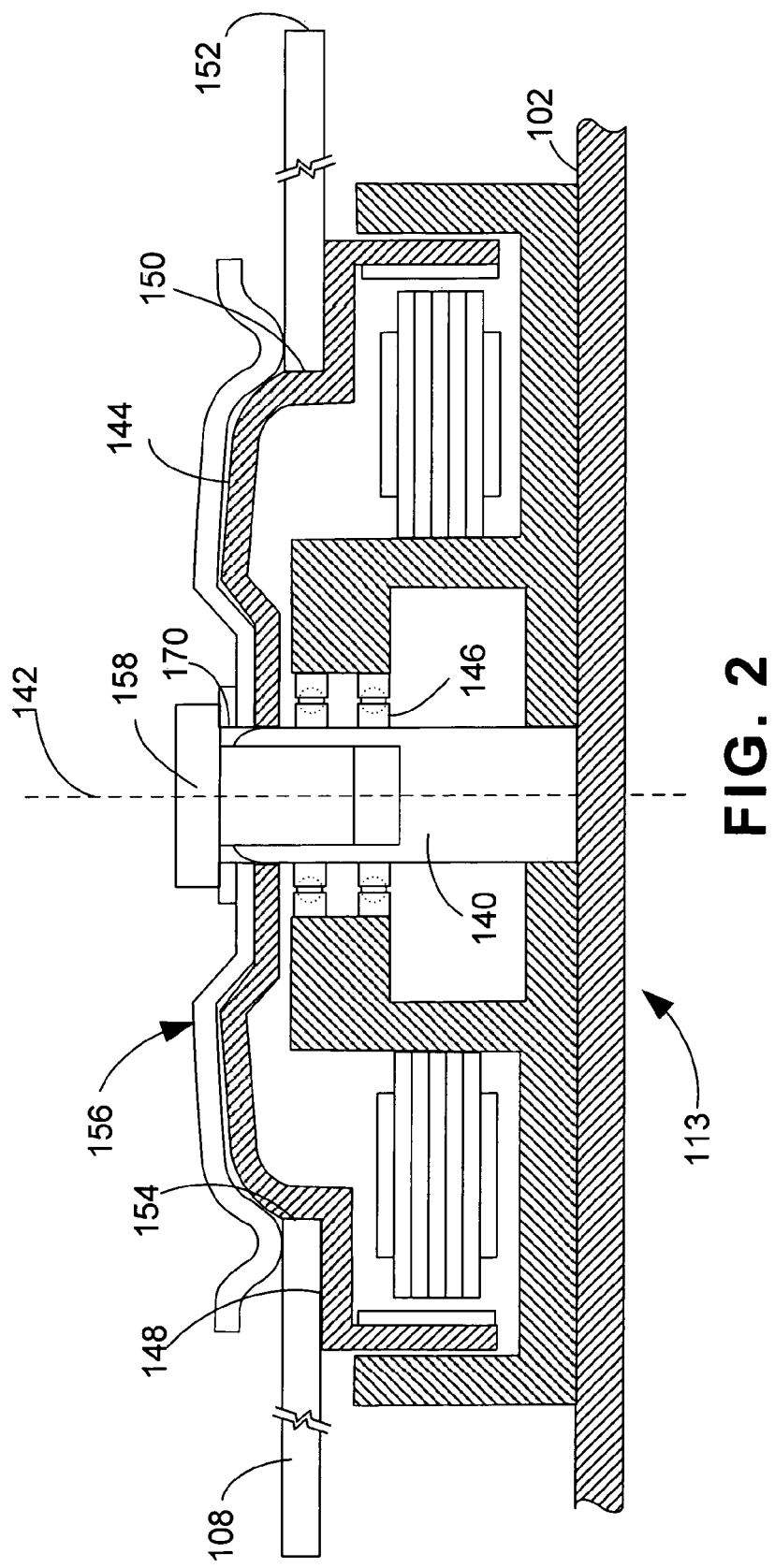
FIG. 2 is a cross-sectional view taken generally along line 2—2 of FIG. 1 where a single disc is clamped on the motor hub.

FIG. 2 shows a partial cross sectional view of the DSA 106. A motor shaft 140 defines an axis 142 of rotation substantially perpendicular to the base 102. A motor hub 144 is fixed for rotation with the motor shaft 140 via one or more bearings 146. The motor hub 144 provides a planer surface 148 supporting the annular disc 108. The disc 108 includes an inner edge 150 and an outer edge 152 where the inner edge 150 is abutted with a cylindrical surface 154. In assembly, the disc 108 is clamped tightly on the motor hub 144 via a clamp 156. A fastener 158 which engages the motor shaft 140 is used to tighten the clamp 156 to the motor hub 144. During drive operations, the disc 108 mounted on the motor hub 144 is rotated about the axis 142 at a constant speed.

Figure 3:
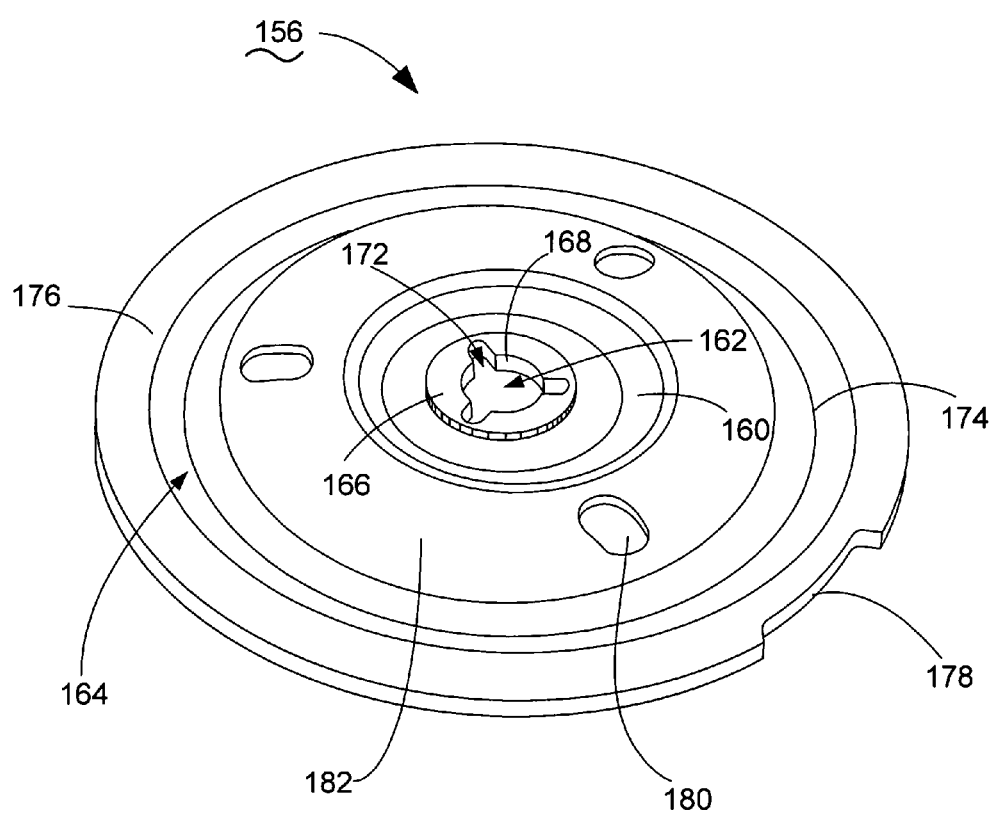
FIG. 3 is an isometric view of a clamp of one embodiment of the present invention.

FIG. 3 illustrates an isometric view of the clamp 156 according to one embodiment of the present invention. The clamp 156 is stamped to have a cylindrical sunk-in portion 160 surrounding a center opening 162 and a contact portion 164 at the circumference of the clamp 156. A protrusion 166 encircling the center opening 162 is provided with a thickness greater than an inner boundary 168 of the clamp 156. This provides positive contact with the fastener 158 (FIG. 2) when the fastener 158 engages the motor shaft 140. A tight tolerance may be established between the outer surface 170 (FIG. 2) of the motor shaft 140 (FIG. 2) and the inner boundary 168 of the clamp 156. At least one notch 172 is defined by the center opening 162. The contact portion 164 includes a circular furrow 174 adjacent with a distal end 176. After the disc 108 (FIG. 1) is clamped on the motor hub 144 (FIG. 2), the circular furrow 174 provides a line contact between the clamp 156 and disc 108 (FIG. 2). Somewhere along the distal end 176 of the clamp 156 an indention feature is defined 178 to act as a balancing feature.

In a modern automated assembling process, one or more machinery arms are used for aligning components together to form a whole. Therefore, a design of the clamp 156 is defined with plurality of apertures 180 on a convex surface 182 for handling by locating members (not shown). A preliminary alignment may be performed by aligning the apertures 180 with alignment features 183 (FIG. 4) of the motor hub 144.

Figure 4:
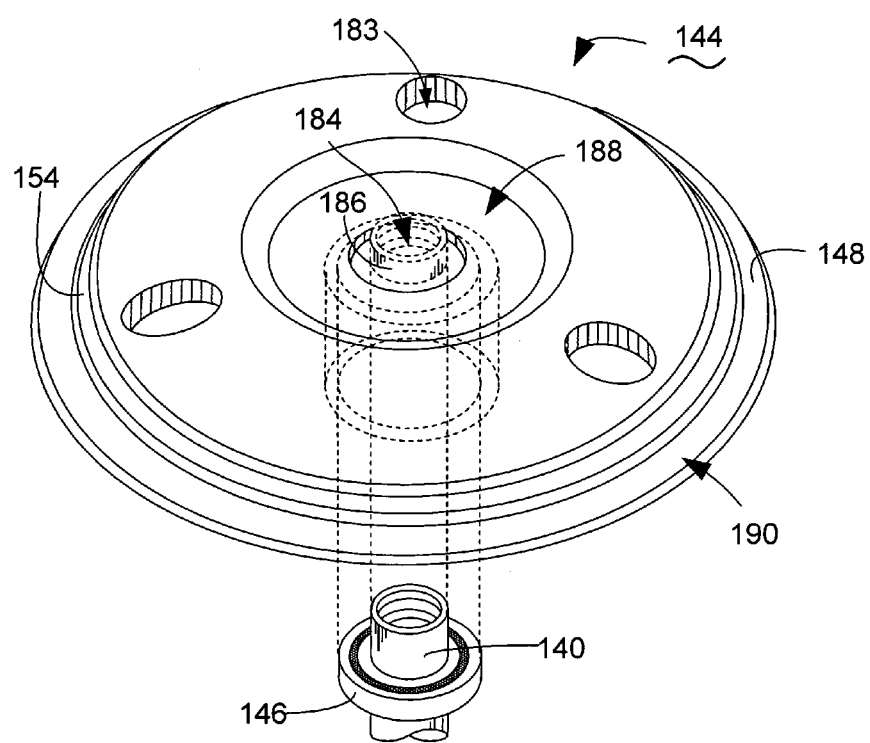
FIG. 4 is an exploded isometric view of the motor hub.

According to one embodiment of the present invention, the motor hub 144 as shown in FIG. 4 is coupled for fixed rotation with the motor shaft 140 (FIG. 2) via one or more bearings 146 (FIG. 2). The motor hub 144 has a center opening 184 for which the motor shaft 140 could extend further through the motor hub 144 to form a protrusion 186. The motor hub 144 further includes an inner rim portion 188 and a disc support portion 190. The annular disc 108 (FIG. 2) is clamped to the planar surface 148 of the disc support portion 190, with at least part of the inner edge 150 of the disc 108 in abutment with at least part of the cylindrical surface 154. Then the clamp 156 is loaded on top of the motor hub 144 to clamp down the disc 108. Subsequently, the cylindrical sunk-in portion 160 of the clamp 156 will horizontally rest on the inner rim portion 188. During the assembling process, the alignment feature 183 is known for use to incorporate with the aperture 180 for the preliminary alignment. Subsequently, the motor shaft protrusion 186 is inserted in the center opening 162 (FIG. 3) of the clamp 156 (FIG. 3), for which, the inner edge 168 (FIG. 3) of the clamp 156 (FIG. 3) abutting with an outer surface 170 of the motor shaft protrusion 186, for a fine alignment with the motor hub 144 before it is tightened with the fastener 158 (FIG. 2).

FIGS. 5 to 8 show the enlarged details of a portion of FIG. 2 of the present invention having the motor hub 144, the motor shaft 140, the fastener 158 and the clamp 156. The right-hand half portion illustrates the stage where the clamp 156 and the fastener 158 are at a pre-depressed position, while the left-hand half portion illustrates the stage where the clamp 156 and the fastener 158 are at a post-depressed position.

Figure 5:
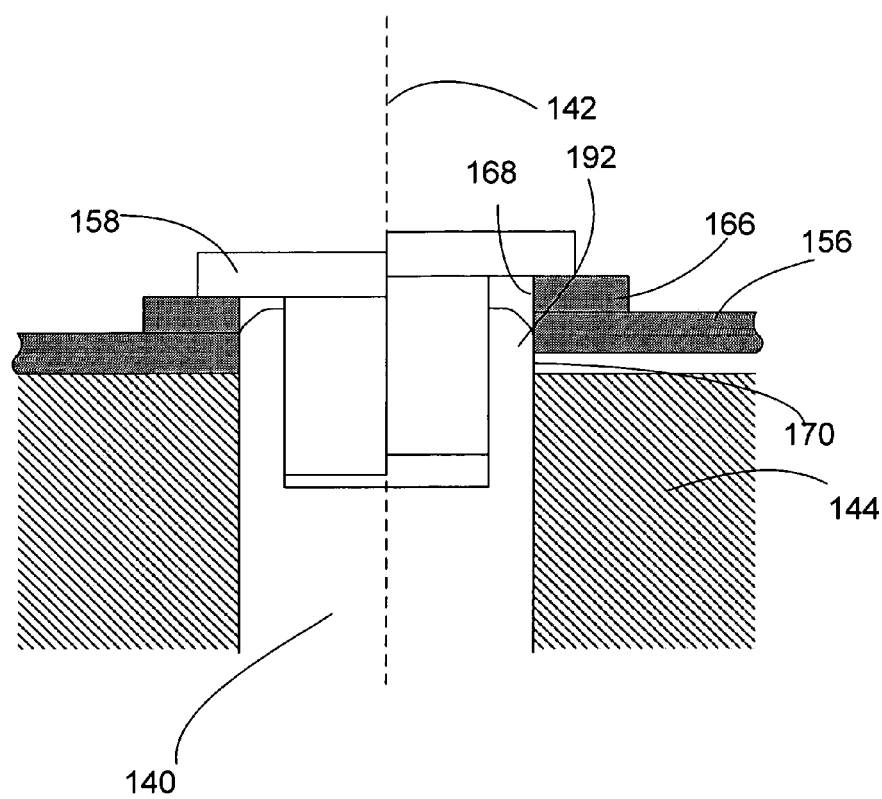
FIG. 5 is an enlarged detail of a portion of the disc drive assembly of FIG. 2 illustrating one embodiment of the present invention.

Prior to a fine alignment of the clamp 156 relative to the motor hub 144, one embodiment of the present invention as illustrated in FIG. 5 shows that the motor shaft 140 provides an alignment feature 192 extending from a center opening of the motor hub 144. The inner boundary 168 (FIG. 3) of the clamp 156 provides a positive engagement with the outer surface 170 of the motor shaft 140.

Figure 7:
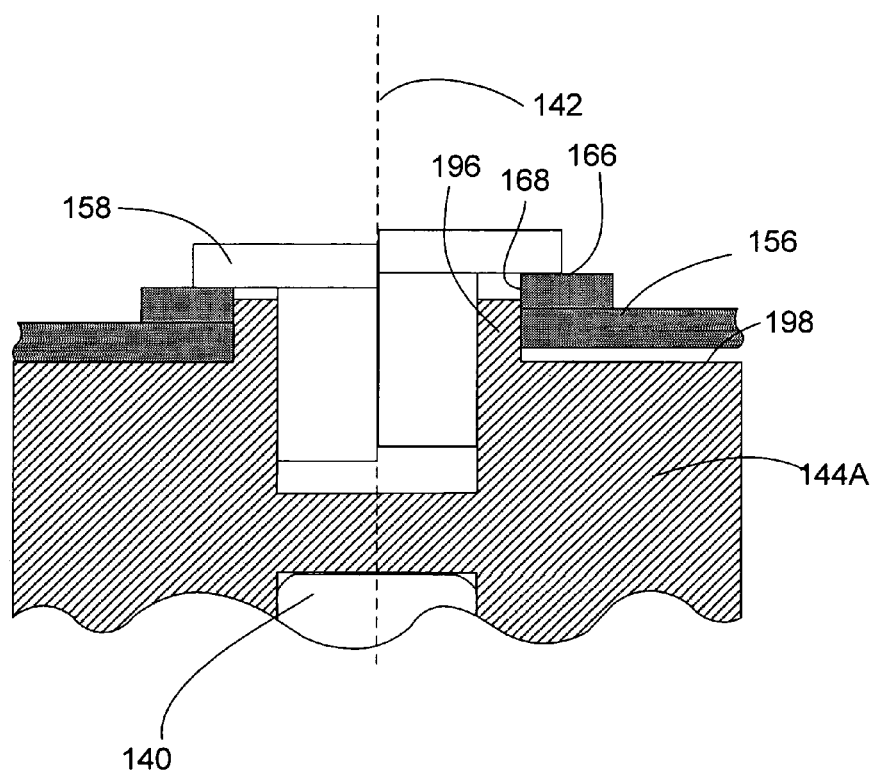
FIG. 7 is an enlarged detail of a portion of the disc drive assembly of FIG. 2 of an alternative embodiment of a motor hub.

FIG. 7 shows another embodiment of the present invention with the motor hub 144A providing an alignment feature. A ring 196 depending from a surface 198 of the motor hub 144A provides the protrusion feature. The clamp 156 inner boundary 168 provides a positive engagement with the ring 196 of the motor hub 144A.

Figure 8:
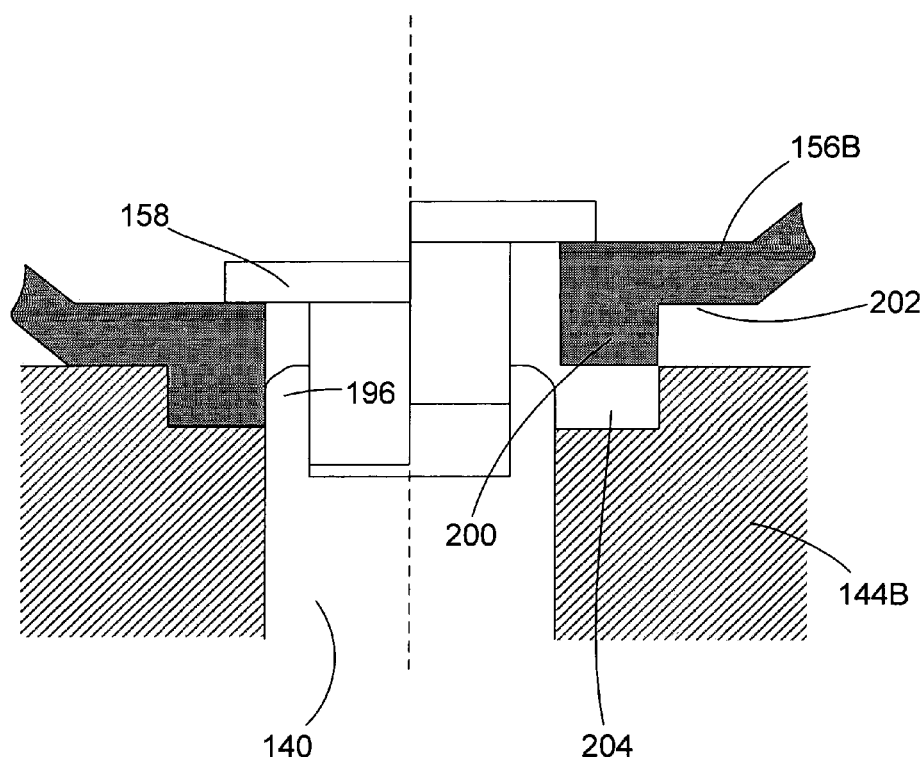
FIG. 8 is an enlarged detail of portion of the disc drive assembly of FIG. 2 of an alternative embodiment of a motor hub and clamp.

Optionally, one other embodiment of the present invention as illustrated in FIG. 8, is such that the motor hub 144B may be assembled with the clamp 156B with some fine alignment between the motor hub 144B and the clamp 156B. The clamp 156B has an alignment feature 200 protruding from a bottom surface 202 of the clamp 156B. A groove 204 surrounding the center of the motor hub 144B is configured to provide an interference fit with the alignment feature 200.

FIG. 5 also illustrates the clamp 156 having the protrusion 166 surrounding the center opening 162 (FIG. 3) of the clamp 156 prior to clamping. The protrusion 166 is required to have a positive contact between the clamp 156 and the fastener 158. This could be performed by ensuring the height of the inner boundary 168 of the clamp 156 is greater than the height dimension of the alignment feature 192.

Figure 6:
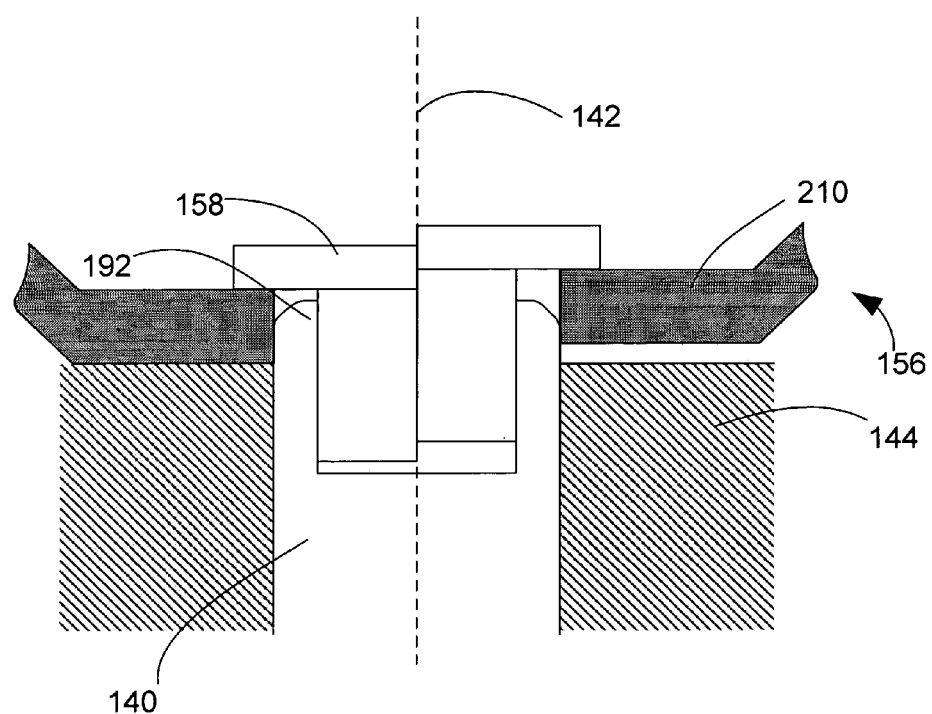
FIG. 6 is an enlarged detail of a portion of the disc drive assembly of FIG. 2 of an alternative embodiment of a clamp.

One embodiment of the present invention as illustrated in FIG. 6 has the clamp 156 fastened on the motor hub 144. The clamp 156 includes a support portion 210 with an operable height greater than the height of the alignment feature 192. Therefore the height difference provides a positive contact between the clamp 156 and the fastener 158.

As illustrated in FIG. 7, the motor hub 144A provides the alignment feature whilst maintaining a positive engagement between the protrusion 166 and the fastener 158. This is achieved by ensuring a height dimension of the inner boundary 168 (FIG. 3) of the clamp 156 is greater than a height dimension of the ring 196.

Another embodiment of the present invention is illustrated in FIG. 8. The clamp 156B has the alignment feature 200 protruding from the bottom surface 202 of the clamp 156B. The alignment feature 200 essentially provides a positive engagement between the clamp 156B and the fastener 158 while preserving a fine alignment for the clamp 156B on the motor hub 144B.

Alternatively described, one embodiment of the present invention provides for an assembly (such as 106) including a spindle motor (such as 113) that has a hub (such as 144) configured for rotation about an axis (such as 142) and an extension (such as 186) protruding from the hub along the axis by a protrusion length. The assembly also includes a clamp (such as 156) that has an inner edge defining a hole (such as 168) for receiving the extension.

The inner edge of the clamp may have a thickness or reference height that is no less than the protrusion length. The extension may be a rotable shaft (such as 140) of the spindle motor or it may be formed as a unitary body with the hub. Optionally, the inner edge of the clamp is configured for interference fit with an outer surface of the extension. In one embodiment, the clamp further includes an indentation feature (such as 178) such that its center of mass does not coincide with its geometric center. The indentation feature may be formed at an outer edge (such as 176) of the clamp. The assembly may further include a fastener (such as 158) which in engagement with the extension comes into abutment with the inner edge of the clamp. In engagement with the fastener, the clamp may be resiliently deformed. In one embodiment, the assembly may also include a disc (such as 108) that is held against the hub of the spindle motor by a contact portion (such as 174) of the clamp. According to another embodiment of the present invention, there is provided the disc drive (such as 100) having the disc, the spindle motor, the clamp and the fastener. The hub of the spindle motor is configured for bearing the disc in rotational motion about the axis, with the extension protruding from the hub along the axis by a protrusion length. The clamp has an inner edge defining a hole for receiving the extension. The fastener in engagement with the extension comes into abutment with the inner edge of the clamp.

Optionally, the disc drive is configured such that the inner edge of the clamp has a thickness or reference height that is no less than the protrusion length. In one embodiment, the disc drive is such that the extension is a rotatable shaft of the spindle motor. In an alternative embodiment, the disc drive is such that the extension and the hub are formed as a unitary body. The disc drive may be configured such that the inner edge of the clamp is configured for interference fit with an outer surface of the extension. Alternatively, the clamp further includes an indentation feature such that its center of mass does not coincide with its geometric center. A method of biasing the clamp and the disc in opposite directions with reference to the center of the motor shaft may be incorporated with the indention feature to provide a counter-balance to the DSA. The indentation feature may be formed at an outer edge of the clamp. In engagement with the fastener, the clamp may be resiliently deformed. In one embodiment, the disc is held against the hub by the contact portion of the clamp.

It is to be understood that even though numerous characteristics and advantages of various embodiments of the present invention have been set forth in the foregoing description, together with details of the structure and function of various embodiments of the present invention, this disclosure is illustrative only, and changes may be made in detail, especially in matters of structure and arrangement of parts within the principles of the present invention to the full extent indicated by the broad general meaning of the terms in which the appended claims are expressed. For example, the shape of the notches may be found differently from that illustrated in FIG. 3, may vary depending on the particular application for the disc drive while maintaining substantially the same functionality without departing from the scope and spirit of the present invention. In another example, although the foregoing describes embodiments of the present invention in the context of a single platter disc drive, they could also be applied in on multiple-platter disc drives where more than one disc is mounted to the motor hub. In addition, although the embodiments described herein are directed to a disc clamp with a motor hub for a data storage system, it will be appreciated by those skilled in the art that the teaching of the present invention can be applied to other systems, without departing from the scope and spirit of the present invention.

What is claimed is:

1. A motor comprising:
    a hub and shaft assembly fixed together for rotation and defining an alignment feature in relation to an axis of rotation; and
    a clamp comprising an edge defining a central aperture adapted for receivingly engaging the alignment feature to align the clamp with the axis of rotation; and
    a fastener with a medial portion thereof passing through the aperture and a distal end of the fastener engaging the hub and shaft assembly to compressingly engage a proximal end of the fastener against a portion of the clamp comprising the edge, fixing the clamp in rotation with the hub and shaft assembly.

2. The motor of claim 1 wherein a longitudinal length of the edge defining the clamp aperture is greater than a longitudinal length of the alignment feature.

3. The motor of claim 1 in which the alignment feature comprises the shaft.

4. The motor of claim 1 in which the alignment feature comprises the hub.

5. The motor of claim 1 in which the aperture is configured for an interference fit with the alignment feature.

6. The motor of claim 1 in which the clamp further comprises an indentation feature such that a center of mass of the clamp does not coincide with the axis of rotation.

7. The motor of claim 6 in which the indentation feature is formed at an outer edge of the clamp.

8. The motor of claim 1 in which the clamp is resiliently deformed by engagement with the fastener.

9. The motor of claim 1 further comprising a first disc, the first disc being held against the hub by a contact portion of the clamp.

10. An apparatus comprising a motor supporting a disc, the motor comprising:
    a hub and shaft assembly fixed together for rotation about an axis of rotation and defining an alignment feature in relation to the axis of rotation;
    a clamp comprising an edge defining a central aperture that is matingly engageable with the alignment feature to align the clamp with the axis of rotation; and
    a fastener with a medial portion thereof passing through the aperture and a distal end of the fastener engaging the hub and shaft assembly to compressingly engage a proximal end of the fastener against a portion of the clamp comprising the edge, fixing the clamp in rotation with the hub and shaft assembly.

11. The apparatus of claim 10 in which the alignment feature comprises the shaft of the hub and shaft assembly.

12. The apparatus of claim 10 in which the alignment feature comprises the hub.

13. The apparatus of claim 10 in which the aperture is configured for an interference fit with the alignment feature.

14. The apparatus of claim 10 in which the clamp further comprises an indentation feature such that a center of mass of the clamp does not coincide with the axis of rotation.

15. The apparatus of claim 14 in which the indentation feature is formed at an outer edge of the clamp.

16. The apparatus of claim 10 in which the clamp is resiliently deformed by engagement with the fastener.

17. The apparatus of claim 10 in which the disc is held against the hub by a contact portion of the clamp.

18. An apparatus comprising:
a base;
a disc stack assembly rotatably mounted to the base; and
means for balancing the disc stack assembly.

19. The apparatus of claim 18 in which the means for balancing is characterized by aligning a clamp of the disc stack assembly with an axis of rotation.

20. The apparatus of claim 19 in which the means for balancing is characterized by rotationally positioning the clamp to offset imbalance of the disc stack assembly.

* * * * *

UNITED STATES PATENT AND TRADEMARK OFFICE
CERTIFICATE OF CORRECTION

PATENT NO. : 7,016,147 B2 Page 1 of 1
APPLICATION NO. : 10/180214
DATED : March 21, 2006
INVENTOR(S) : Victor Chi Siang Choo et al.

It is certified that error appears in the above-identified patent and that said Letters Patent is hereby corrected as shown below:

<u>Title page, Item [54] and Column 1, line 1,</u>
Title, replace "DISK CLAMP BALANCING IN A DISC STACK ASSEMBLY" with -- CENTRALLY FASTENED DISC CLAMP AND ALIGNMENT FASTENER --.

Signed and Sealed this

Twentieth Day of June, 2006

JON W. DUDAS
*Director of the United States Patent and Trademark Office*